United States Patent
Kajino

(10) Patent No.: US 8,223,514 B2
(45) Date of Patent: Jul. 17, 2012

(54) DC-DC CONVERTER CIRCUIT, ELECTRO-OPTIC DEVICE, AND ELECTRONIC DEVICE

(75) Inventor: Kiichi Kajino, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 248 days.

(21) Appl. No.: 12/710,639

(22) Filed: Feb. 23, 2010

(65) Prior Publication Data

US 2010/0225291 A1 Sep. 9, 2010

(30) Foreign Application Priority Data

Mar. 6, 2009 (JP) ................................. 2009-053297

(51) Int. Cl.
*H02M 3/18* (2006.01)
*G05F 1/40* (2006.01)
(52) U.S. Cl. .......................................... 363/59; 323/288
(58) Field of Classification Search .............. 363/59–61; 327/536; 323/282, 288
See application file for complete search history.

(56) References Cited

U.S. PATENT DOCUMENTS

| 5,179,289 | A | * | 1/1993 | Sridharan | 307/110 |
| 5,764,501 | A | * | 6/1998 | Limpaecher | 363/61 |
| 6,198,645 | B1 | * | 3/2001 | Kotowski et al. | 363/59 |
| 7,907,074 | B2 | * | 3/2011 | Zanchi et al. | 341/155 |
| 2009/0121912 | A1 | * | 5/2009 | Zanchi et al. | 341/172 |
| 2010/0066707 | A1 | * | 3/2010 | Zebedee | 345/204 |
| 2011/0273761 | A1 | * | 11/2011 | Kajino | 359/296 |

FOREIGN PATENT DOCUMENTS

JP 2007-195345 A 8/2007

* cited by examiner

*Primary Examiner* — Jessica Han
(74) *Attorney, Agent, or Firm* — AdvantEdge Law Group, LLC

(57) ABSTRACT

A DC-DC converter circuit includes a boosting circuit having at least part of a DC-DC converter; a control signal circuit that controls the boosting circuit; and a power supply unit being electrically connected to both of the boosting circuit and the control signal circuit and supplying at least the control signal circuit with electric power. The DC-DC converter includes a plurality of capacitors and switching units enabling each of the plurality of capacitors to be electrically independent, and the control signal circuit transmits a signal to the switching units when the DC-DC converter is not operating in intermittent operation thereof, the signal indicating each of the plurality of capacitors being made to be electrically independent.

4 Claims, 6 Drawing Sheets

|   | SW1 | SW2 | SW3 | SW4 | SW5 |
|---|-----|-----|-----|-----|-----|
| a | LO  | LO  | LO  | LO  | LO  |
| b | LO  | LO  | LO  |     |     |
| c | LO  | LO  | LO  |     |     |

|   | SW1 | SW2 | SW3 | SW4 | SW5 |
|---|-----|-----|-----|-----|-----|
| a | HI  | HI  | HI  | LO  | HI  |
| b | LO  | LO  | LO  |     |     |
| c | HI  | HI  | HI  |     |     |

|   | SW1 | SW2 | SW3 | SW4 | SW5 |
|---|-----|-----|-----|-----|-----|
| a | LO  | LO  | LO  | HI  | HI  |
| b | HI  | HI  | HI  |     |     |
| c | LO  | LO  | LO  |     |     |

DC-DC CONVERTER CIRCUIT, ELECTRO-OPTIC DEVICE, AND ELECTRONIC DEVICE

BACKGROUND

1. Technical Field

The present invention relates to the technical field of a DC-DC converter circuit used, for example, in a power supply unit, an electro-optic device including the DC-DC converter circuit, and an electronic device including the electro-optic device.

2. Related Art

For example, a DC-DC converter (DC-voltage converter) having a voltage control circuit and a plurality of unit boosting circuits has been proposed as a DC-DC converter included in the above devices. In the DC-DC converter, the plurality of unit boosting circuits are connected in series between a DC power supply and an output terminal. The voltage control circuit allows all of the unit boosting circuits to perform discharging after allowing the unit boosting circuits, the number of which is determined by a command signal, to perform charging or allowing the unit boosting circuits, the number of which is determined by a command signal to stop charging (see JP-A-2007-195345).

However, in the above-described related art, in the case where a DC-DC converter is subjected to intermittent operation at predetermined time intervals, electric charges stored in a capacitor included in the DC-DC converter may be released when the DC-DC converter is not operating. Accordingly, the capacitor needs to be charged in the case of restarting the operation of the DC-DC converter, resulting in a technical problem that electrical power consumption is increased in the DC-DC converter.

SUMMARY

An advantage of some aspects of the invention is to provide a DC-DC converter circuit, an electro-optic device, and an electronic device which enable the release of electric charges from a capacitor to be suppressed when the DC-DC converter is not operating in intermittent operation thereof.

According to an aspect of the invention, there is provided a DC-DC converter circuit including a boosting circuit having at least part of a DC-DC converter, a control signal circuit that controls the boosting circuit, and a power supply unit being electrically connected to both of the boosting circuit and the control signal circuit and supplying at least the control signal circuit with electric power. The DC-DC converter includes a plurality of capacitors and switching units which enable each of the plurality of capacitors to be electrically independent. The control signal circuit transmits a signal to the switching units when the DC-DC converter is not operating in intermittent operation thereof, the signal indicating that each of the plurality of capacitors is made to be electrically independent.

In the DC-DC converter circuit according to the aspect of the invention, the boosting circuit includes at least part of the DC-DC converter. The DC-DC converter has a plurality of capacitors and switching units which enable each of the plurality of capacitors to be electrically independent. The term "electrically independent" means that each of the plurality of capacitors is not electrically connected to other capacitors or other elements such as a ground electrode.

The switching units not only enable a plurality of capacitors to be electrically independent, but enable the plurality of capacitors to be electrically connected in parallel or in series to a DC power supply, for example.

When a plurality of capacitors are electrically connected to a DC power supply in parallel, electric charges are stored in the plurality of capacitors (namely, charging). On the other hand, when a plurality of capacitors are electrically connected to a DC power supply in series, electric charges stored in the plurality of capacitors are discharged (namely, discharging).

The control signal circuit controls the boosting circuit. Specifically, for example, the control signal circuit controls the boosting circuit by transmitting the following signals to the switching units: a signal indicating that a plurality of capacitors are made to be electrically connected to a DC power supply in parallel; a signal indicating that a plurality of capacitors are made to be electrically connected to a DC power supply in series; or a signal indicating that each of a plurality of capacitors is made to be electrically independent.

In the aspect of the invention, particularly, in the case where a DC-DC converter is not operating in intermittent operation thereof, the control signal circuit transmits to a switching unit a signal indicating that each of a plurality of capacitors is made to be electrically independent.

The power supply unit is electrically connected to both of the boosting circuit and the control signal circuit and supplies at least the control signal circuit with power. The power supply unit may be configured so as not to be constantly electrically connected to both of the boosting circuit and the control signal circuit. For example, electrical connection to one or both of the boosting circuit and the control signal circuit may be cut with a switching device if needed.

According to a study of the inventor, there have been circuits in which at least part of capacitors included in a DC-DC converter are electrically connected to, for example, a DC power supply even when the DC-DC converter is not operating. Consequently, in the case where a voltage of a DC power supply is set to zero when a DC-DC converter is not operating, electric charges stored in a capacitor are released. As a result, a capacitor needs to be charged in the case where a DC-DC converter is made to operate again. It is found that electric power consumption is increased and that a voltage rise time in the case of restarting the operation of the DC-DC converter is increased.

According to the aspect of the invention, in the case where a DC-DC converter is not operating in intermittent operation thereof, a control signal circuit transmits to a switching unit a signal indicating that each of a plurality of capacitors is made to be electrically independent. As a result, because each of the plurality of capacitors is made to be electrically independent when the DC-DC converter is not operating, a path through which electric charges are released from each of the plurality of capacitors is excluded. Consequently, a capacitor does not need to be charged when a DC-DC converter is made to operate again.

Accordingly, a DC-DC converter circuit of the aspect of the invention can suppress the release of electric charges from a capacitor when a DC-DC converter is not operating in intermittent operation thereof. In addition, a voltage rise time in the case of restarting the operation of the DC-DC converter can be decreased or excluded.

It is preferable that the power supply unit in the DC-DC converter circuit includes a capacitor for supplying electric power, the capacitor being electrically connected to both of the boosting circuit and the control signal circuit. The power supply unit supplies the control signal circuit with electric power using electric charges stored in the capacitor for supplying electric power when the DC-DC converter is not operating.

According to the above-described DC-DC converter circuit, a control signal circuit is made to operate without the supply of electric power from an external power supply (namely, a power supply which is not included in the DC-DC converter circuit) when a DC-DC converter is not operating, which is significantly advantageous in practical use.

It is preferable that the capacitor for supplying electric power be included in part of the DC-DC converter.

This configuration needs no addition of a capacitor exclusively used as a capacitor for supplying electric power to a circuit, so that the size of the DC-DC converter circuit and the production cost are reduced, which is significantly advantageous in practical use.

According to another aspect of the invention, there is provided an electro-optic device including the DC-DC converter circuit (also including various embodiments thereof, however) of the invention.

According to the electro-optic device of the aspect of the invention, the device includes the DC-DC converter circuit of the invention, the release of electric charges from a capacitor is suppressed when a DC-DC converter is not operating in intermittent operation thereof.

According to further another aspect of the invention, there is provided an electronic device including the electro-optic device of the invention.

According to the electronic device of the invention, the device includes the electro-optic device of the invention, it is possible to reduce power consumption and to realize various types of electronic devices such as a projection-type display device, a cellular phone, an electronic organizer, a word processor, a view-finder-type or monitoring-type of video tape recorder, a workstation, a video phone, a point of sales (POS) terminal, and a touch panel, each having excellent display capability.

As electronic devices according to the invention, it is possible to realize, for example, an electrophoretic display device as an electronic paper, an electron emission device (Field Emission Display, Conduction Electron-Emitter Display), and a display device using the electrophoretic display device and/or electron emission device.

The operation and other advantages of the invention will be clarified by embodiments which will be described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

A DC-DC converter circuit according to the invention, an electro-optic device including the DC-DC converter circuit, and an electronic device including the electro-optic device will be described hereinafter with reference to accompanying drawings.

DC-DC Converter Circuit

First, a DC-DC converter circuit will be described with reference to FIGS. 1 to 6.

Configuration of DC-DC Converter Circuit

Figure 1:
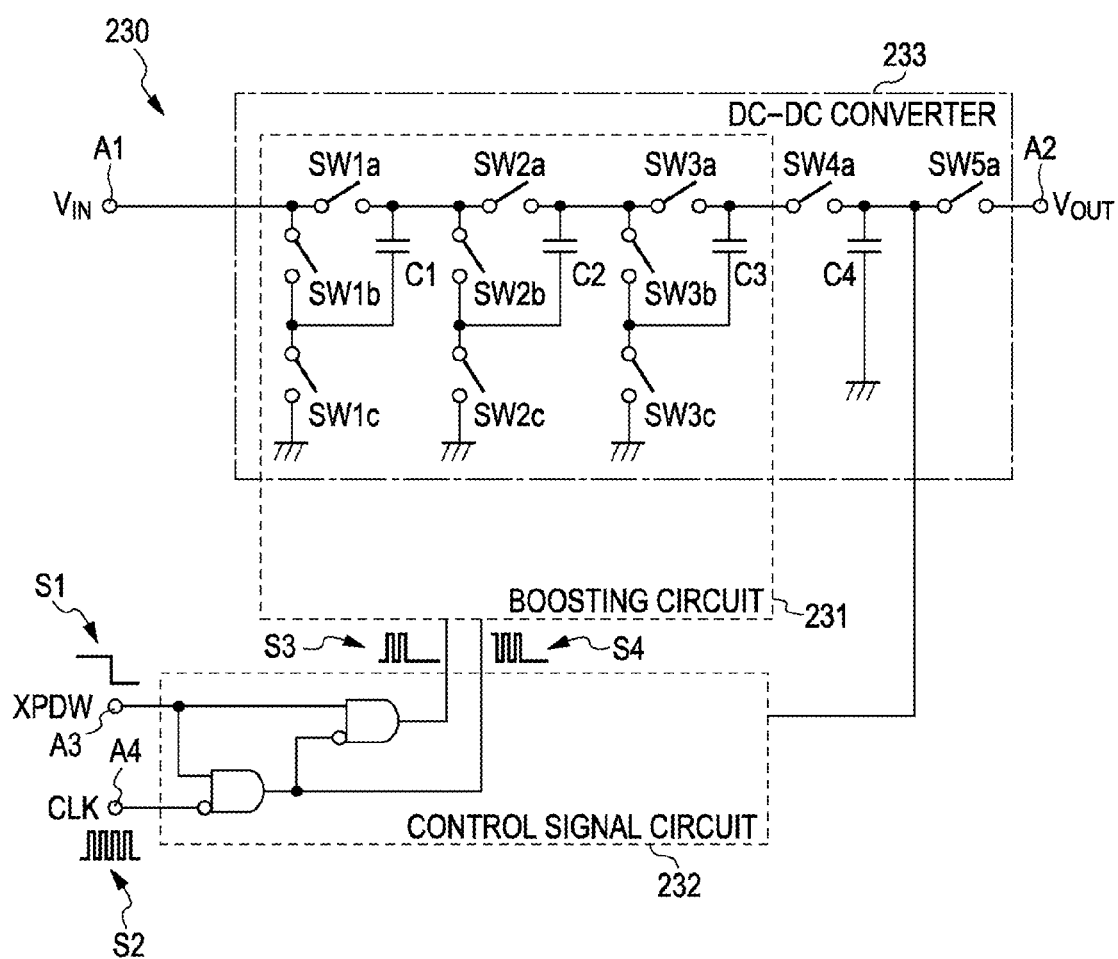
FIG. 1 is a block diagram illustrating the general configuration of a DC-DC converter circuit according to an embodiment of the invention.

The general configuration of a DC-DC converter circuit according to an embodiment of the invention will be described with reference to FIG. 1. FIG. 1 is a block diagram illustrating the general configuration of a DC-DC converter circuit according to an embodiment of the invention. FIG. 1 illustrates a non-operating state of a DC-DC converter.

As illustrated in FIG. 1, a DC-DC converter circuit 230 includes a boosting circuit 231 including at least part of a DC-DC converter 233 and a control signal circuit 232 that controls the boosting circuit 231.

The control signal circuit 232 includes a logic circuit in which positive logic and negative logic exist as shown in FIG. 1. A signal having a waveform indicated by S1 in FIG. 1 is input into a terminal A3 as a first input terminal of the control signal circuit 232, and a signal having a waveform indicated by S2 in FIG. 1 is input into a terminal A4 as a second input terminal, so that signals having waveforms indicated by S3 and S4 in FIG. 1 are output to control the boosting circuit 231.

The DC-DC converter 233 is a charge pump type DC-DC converter and includes capacitors C1, C2, C3, and C4 and switches SW1*a*, SW1*b*, SW1*c*, SW2*a*, SW2*b*, SW2*c*, SW3*a*, SW3*b*, SW3*c*, SW4*a*, and SW5*a*. "The capacitors C1, C2, and C3", "the capacitor C4", and "the switches SW1*a*, SW1*b*, SW1*c*, SW2*a*, SW2*b*, SW2*c*, SW3*a*, SW3*b*, SW3*c*, SW4*a*, and SW5*a*" according to the embodiment are examples of "a plurality of capacitors", "a capacitor for supplying electric power", and "switching units" according to the invention, respectively.

The DC-DC converter 233 is configured to boost a power supply potential (for example, 3 V) input to an input terminal A1 from an external power supply (not shown) and output a high potential (for example, 12 V) from an output terminal A2.

An end of the switch SW1*a* is connected in series to an end of the switch SW2*a*. Similarly, an end of the switch SW1*b* is connected in series to an end of the switch SW1*c*. Another end of the switch SW1*c* is connected to ground. The capacitor C1 is connected to a node between the switches SW1*a* and SW2*a* and connected to another node between the switches SW1*b* and SW1*c*.

Another end of the switch SW2*a* is connected to an end of the switch SW3*a*. An end of the switch SW2*b* is connected in series to an end of the switch SW2*c*. Another end of the switch SW2c is connected to ground. The capacitor C2 is connected to a node between the switches SW2a and SW3a and connected to another node between the switches SW2b and SW2c.

Another end of the switch SW3a is connected to an end of the switch SW4a. An end of the switch SW3b is connected in series to an end of the switch SW3c. Another end of the switch SW3c is connected to ground. The capacitor C3 is connected to a node between the switches SW3a and SW4a and connected to another node between the switches SW3b and SW3c.

Another end of the switch SW4a is connected to an end of the switch SW5a. Another end of the switch SW5a is connected to the terminal A2. An end of the capacitor C4 is connected to a node between the switches SW4a and SW5a. Another end of the capacitor C4 is connected to ground. The capacitor C4 is so-called a smoothing capacitor.

Operation of DC-DC Converter Circuit

In the intermittent operation of the DC-DC converter circuit 230 having the above configuration, turning on and off of at least the switch SW5a are alternately switched on the basis of a signal output from the control signal circuit 232, so that an operating state and a non-operating state of the DC-DC converter 233 are alternately switched.

Figures 2, 3, 4:
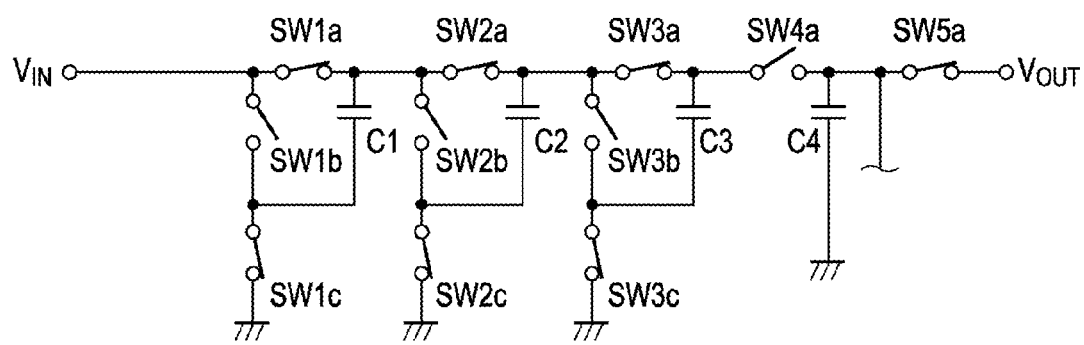
FIG. 2 is a table showing potential levels of signals which are individually input into the switches of a DC-DC converter according to an embodiment of the invention when the DC-DC converter is not operating.
FIG. 3 is a circuit diagram of a DC-DC converter according to an embodiment of the invention when the DC-DC converter is operating and is being charged.
FIG. 4 is a table showing potential levels of signals which are individually input into the switches of a DC-DC converter according to an embodiment of the invention when the DC-DC converter is operating and is being charged.

In the embodiment, signals shown in FIG. 2 are individually input into the switches of the DC-DC converter 233 specifically when the DC-DC converter 233 is not operating, so that not only the switch SW5a but all of the switches SW1a, SW1b, SW1c, SW2a, SW2b, SW2c, SW3a, SW3b, SW3c, and SW4a will be in an off state.

FIG. 2 is a table showing potential levels of signals which are individually input into the switches of a DC-DC converter according to an embodiment of the invention when the DC-DC converter is not operating. Each of the switches is off (namely, OPEN) in the case where the potential level is "LO", whereas each of the switches is on (namely, CLOSE) in the case where the potential level is "HI". The switches SW1a, SW1b, SW1c, SW2a, SW2b, SW2c, SW3a, SW3b, SW3c, SW4a, and SW5a may be configured with n-type transistors. In this case, signals of a potential shown in FIG. 2 are supplied to a gate electrode of a transistor.

In the case where the DC-DC converter 233 is operating, turning on and off of a set of switches including the switches SW1a, SW1c, SW2a, SW2c, SW3a, SW3c (hereinafter referred to as "a first set of switches", if necessary) and a set of switches including the switches SW1b, SW2b, SW3b, and SW4a (hereinafter referred to as "a second set of switches", if necessary) are alternately executed on the basis of a signal output from the control signal circuit 232, so that a power supply potential input into the terminal A1 is boosted to a high potential and then output from the output terminal A2.

In particular, as shown in FIG. 3, the first set of switches is set to an on state, and the second set of switches is set to an off state, so that power supply potentials are applied to each of the capacitors C1, C2, and C3, leading to electric charges being stored. In this case, signals shown in FIG. 4 are individually input into the switches of the DC-DC converter 233.

FIG. 3 is a circuit diagram of a DC-DC converter according to the embodiment when the DC-DC converter is operating and is being charged. FIG. 4 is a table showing potential levels of signals which are individually input into the switches of a DC-DC converter according to the embodiment when the DC-DC converter is operating and is being charged.

Figures 5, 6:
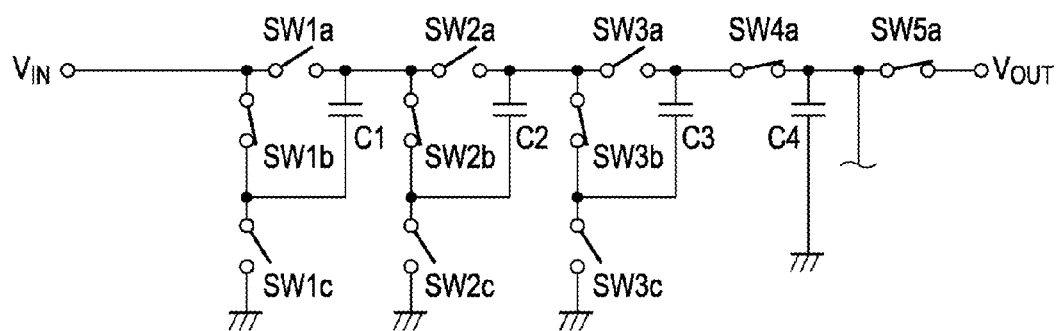
FIG. 5 is a circuit diagram of a DC-DC converter according to an embodiment of the invention when the DC-DC converter is operating and is being discharged.
FIG. 6 is a table showing potential levels of signals which are individually input into the switches of a DC-DC converter according to an embodiment of the invention when the DC-DC converter is operating and is being discharged.

As illustrated in FIG. 5, the first set of switches is set to an off state, and the second set of switches is set to an on state, so that the capacitors C1, C2, and C3 will be connected in series with each other. Accordingly, the output potential of the DC-DC converter circuit 230 is increased four times an input potential thereof. In this case, signals shown in FIG. 6 are individually input into the switches of the DC-DC converter 233.

FIG. 5 is a circuit diagram of a DC-DC converter according to the embodiment of the invention when the DC-DC converter is operating and is discharging. FIG. 6 is a table showing potential levels of signals which are individually input into the switches of a DC-DC converter according to the embodiment of the invention when the DC-DC converter is operating and is discharging.

In the embodiment, although the DC-DC converter circuit 230 is configured such that the output potential is increased four times the input potential, it is not limited to the embodiment. For example, a DC-DC converter circuit may be configured such that the output potential is increased five times or more the input potential.

The inventor has studied and found that there have been DC-DC converter circuits which only perform alternate switching of the switches between a state shown in FIG. 3 and a state shown in FIG. 5. In such circuits, in the case where a DC-DC converter is made to intermittently operate, no electric power is supplied to the DC-DC converter to make the DC-DC converter be in a non-operating state. Accordingly, a capacitor included in the DC-DC converter is electrically connected to, for example, an external electric power supply or ground even when the DC-DC converter is not operating (see capacitors C1, C2, and C3 in FIGS. 3 and 5, for example). Consequently, electric charges stored in the capacitor when the DC-DC converter is not operating are released. As a result, the capacitor must be charged when the DC-DC converter is operated again, resulting in the increase in electric power consumption and time necessary for a voltage rise when operation is restarted.

On the other hand, in the embodiment, each of the switches of the DC-DC converter 233 is set to an off state when the DC-DC converter 233 is not operating as shown in FIG. 1, so that each of the capacitors C1, C2, and C3 becomes electrically independent. As a result, it is possible to eliminate a path through which electric charges are released from each of the capacitors C1, C2, and C3 when the DC-DC converter is not operating. The capacitors C1, C2, and C3 do not need to be charged when the DC-DC converter 233 is operated again.

In addition, in the embodiment, the capacitor C4 as an example of a power supply unit according to the invention is charged when the DC-DC converter 233 is operating, and then the charged capacitor C4 supplies the control signal circuit 232 with electric power when the DC-DC converter 233 is not operating. In other words, in the DC-DC converter circuit 230 according to the embodiment, electric power supplied to the boosting circuit 231 and the control signal circuit 232 is not all shut down when the DC-DC converter 233 is not operating, but the control signal circuit 232 is supplied with electric power.

In particular, the capacitor C4 is used as a power supply for the control signal circuit 232 when the DC-DC converter 233 is not operating, so that the control signal circuit 232 can be operated without the supply of electric power from outside the circuit.

Meanwhile, the capacitors C1, C2, and C3 may be used as a capacitor for supplying electric power to the control signal circuit 232 (namely, a capacitor for supplying electric power) instead of the capacitor C4.

Each of the switches SW1a, SW1b, SW1c, SW2a, SW2b, SW2c, SW3a, SW3b, SW3c, SW4a, and SW5a may be a p-type transistor, if needed. In this case, a switch configured with a p-type transistor may be supplied with a signal in which "HI" and "LO" in FIGS. 2, 4, and 6 are replaced with each other.

Electro-Optic Device

An electro-optic device including the above DC-DC converter circuit will be described with reference to FIGS. 7 and 8. In the embodiment, an electrophoretic display device will be described as an example of the electro-optic device.

The general configuration of an electrophoretic display device according to the embodiment will be described with reference to FIG. 7. FIG. 7 is a block diagram illustrating the general configuration of an electrophoretic display device according to the embodiment.

Figure 7:
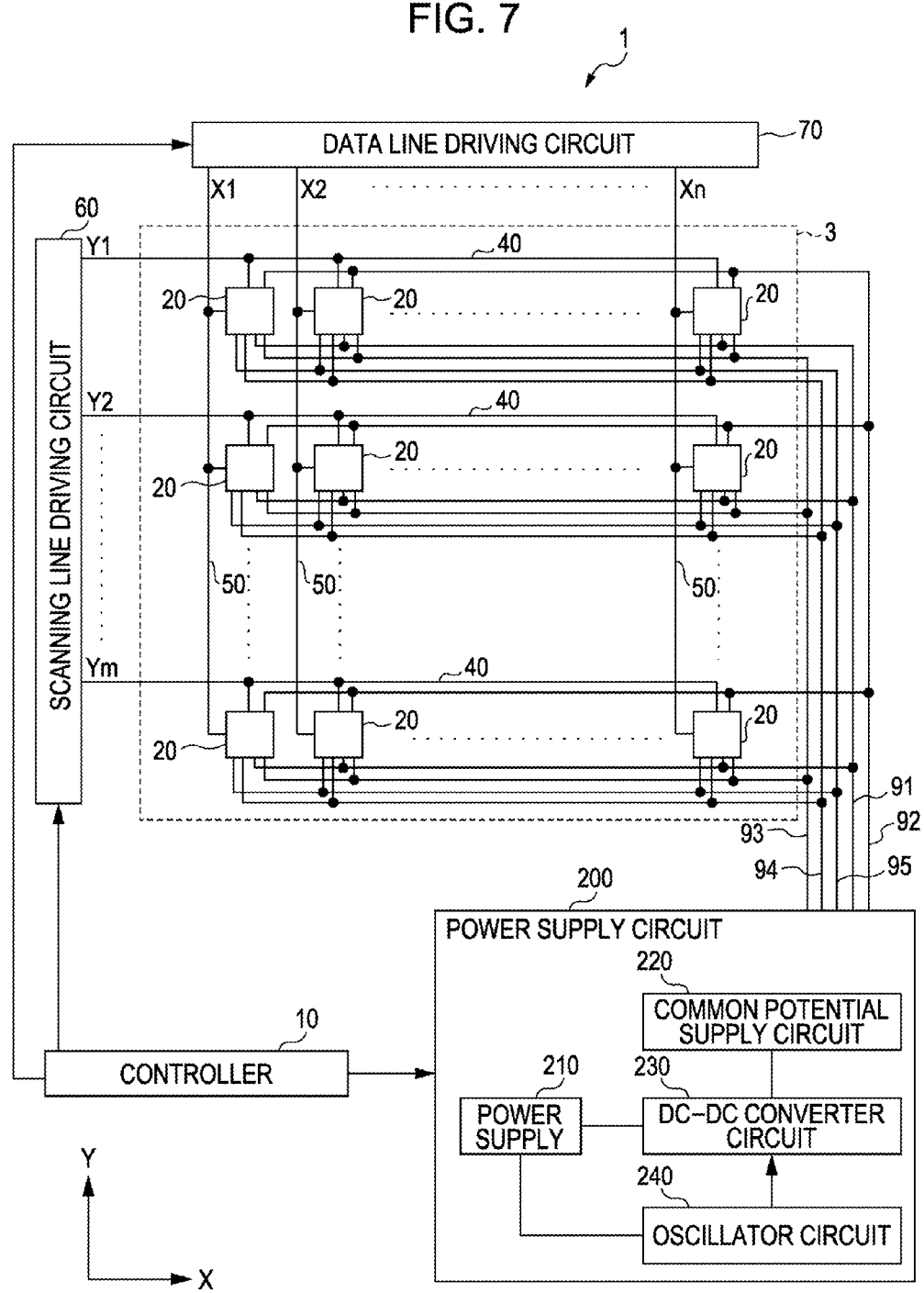
FIG. 7 is a block diagram illustrating the general configuration of an electrophoretic display device according to an embodiment of the invention.

As illustrated in FIG. 7, a electrophoretic display device 1 according to the embodiment includes a display 3, a scanning line driving circuit 60, a data line driving circuit 70, a controller 10, and a power supply circuit 200.

In the display 3, pixels 20 of m-rows by n-columns are disposed in a matrix (two-dimensional plane). In addition, in the display 3, m scanning lines 40 (namely, scanning lines Y1, Y2 . . . , and Ym) and n data lines 50 (namely, data lines X1, X2 . . . , and Xn) are provided so as to intersect each other. That is, the m scanning lines 40 extend in a row direction (namely, X direction), and n data lines 50 extend in a column direction (namely, Y direction). The pixels 20 are disposed corresponding to the intersections of the m scanning lines 40 with the n data lines 50.

The controller 10 controls the operation of the scanning line driving circuit 60, data line driving circuit 70, and power supply circuit 200. The controller 10 stores image data input from outside into a memory and controls the operation of various circuits depending on the image data.

The scanning line driving circuit 60 sequentially provides each of the scanning lines Y1, Y2 . . . , and Ym with a scanning signal on a pulse basis depending on a timing signal. The data line driving circuit 70 provides each of the data lines X1, X2 . . . , and Xn with an image signal on the basis of a timing signal. The image signal has a binary level of a high potential level (referred to as "high level" hereinafter, for example, 5 V) and a low potential level (referred to as "low level" hereinafter, for example, 0 V).

The power supply circuit 200 provides a high potential power line 91 with a high power supply potential Vdd, provides a low potential power line 92 with a low power supply potential Vss, provides a common power line 93 with a common potential Vcom, provides a first control line 94 with a first potential S1, and provides a second control line 95 with a second potential S2. Although it is not shown in the figure, each of the high potential power line 91, low potential power line 92, common power line 93, first control line 94, and second control line 95 is electrically connected to the power supply circuit 200 through an electric switch. Furthermore, each of the pixels 20 is electrically connected to the high potential power line 91, low potential power line 92, common power line 93, first control line 94, and second control line 95. Each of the high potential power line 91, low potential power line 92, common power line 93, first control line 94, and second control line 95 is wired in common to the pixels belonging to a pixel row with respect to every pixel row typically as shown in FIG. 7, the pixel row including the pixels 20 placed along the row direction (X direction).

The power supply circuit 200 includes a power supply 210, a common potential supply circuit 220, the DC-DC converter circuit 230 according to the above embodiment, and an oscillator circuit 240.

The power supply 210 is a primary battery or a secondary battery and supplies the common potential supply circuit 220, DC-DC converter circuit 230, and oscillator circuit 240 with electric power. The power supply 210 outputs a power supply voltage Vdc (3 V, for example). Although the power supply 210 provides the common potential supply circuit 220, DC-DC converter circuit 230, and oscillator circuit 240 with electric power in the embodiment, it is not limited to an example of the embodiment. The power supply 210 may provide other circuits, for example, the controller 10, with electric power.

The common potential supply circuit 220 is electrically connected to the common power line 93 through a switch 93s (see FIG. 8) and outputs the common potential Vcom on the basis of a voltage applied from the DC-DC converter circuit 230. In the embodiment, the common potential supply circuit 220 is electrically connected to the first control line 94 through a switch 94s (see FIG. 8) and outputs the common potential Vcom as a first potential S1 to the first control line 94.

The DC-DC converter circuit 230 is electrically connected to the high potential power line 91 through a switch 91s (see FIG. 8), generates a high potential VH (12 V, for example) on the basis of the power supply voltage Vdc (3 V, for example) applied from the power supply 210, and outputs the high potential VH as a high power supply potential Vdd.

The oscillator circuit 240 is an oscillator circuit including, for example, a ring oscillator and provides the DC-DC converter circuit 230 with a clock signal. The oscillator circuit 240 is configured such that the frequency of a clock signal to be output can be changed under the control of the controller 10.

The power supply circuit 200 includes a ground terminal (not shown) which is set to a low potential VL as being electrically connected to ground. The low potential VL is output as a low power supply potential Vss from the ground terminal to the low potential power line 92.

Figure 8:
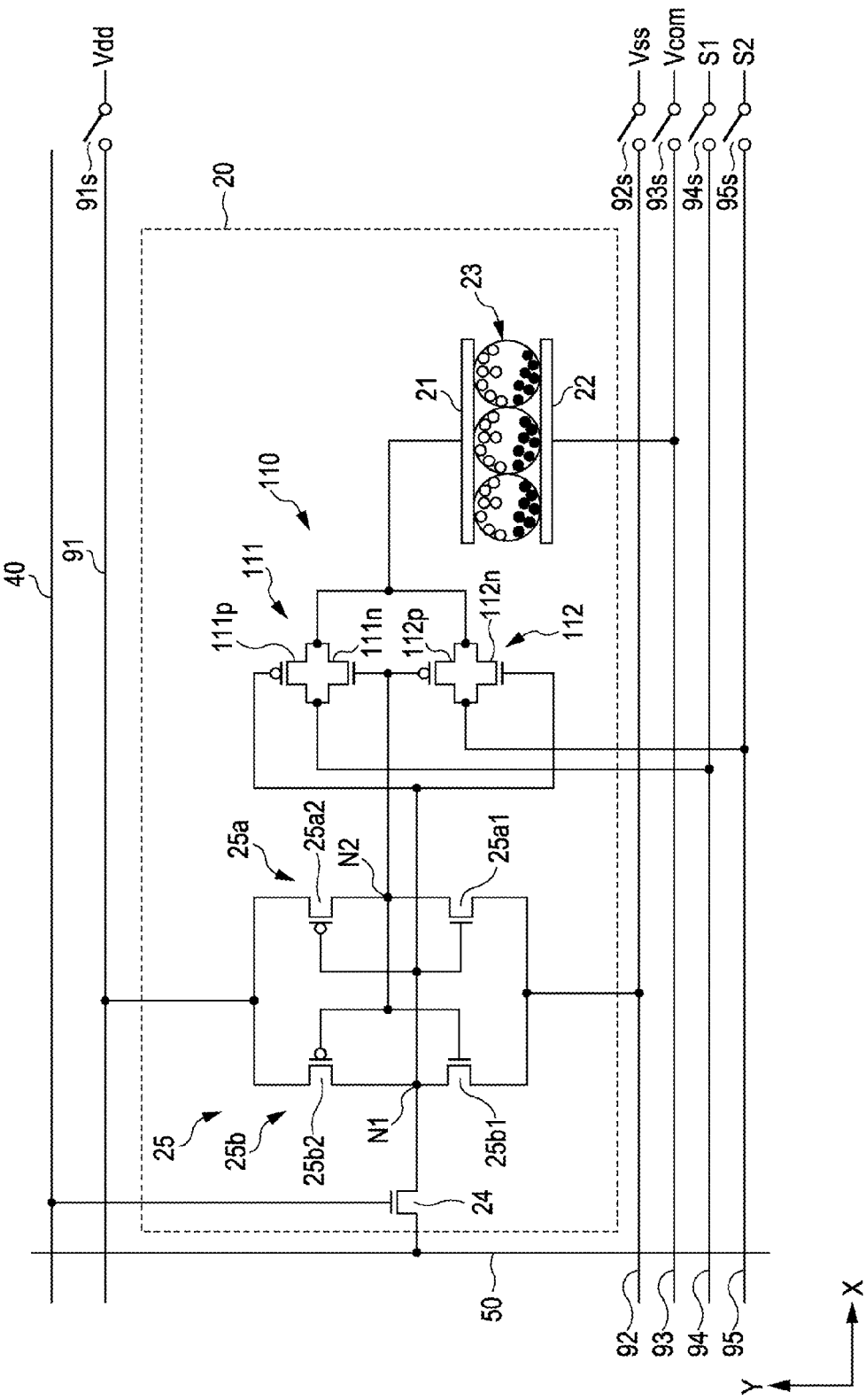
FIG. 8 is an equivalent circuit diagram illustrating the electrical configuration of a pixel.

In the embodiment, the second control line 95 is configured so as to be electrically connected to the DC-DC converter circuit 230 and the ground terminal through a switch 95s (see FIG. 8). The high potential VH output from the DC-DC converter circuit 230 and the low potential VL output from the ground terminal are switched to be output as a second potential S2 to the second control line 95.

The basic structure of the pixel 20 of the electrophoretic display device 1 will be described with reference to FIG. 8. FIG. 8 is an equivalent circuit diagram illustrating the electrical configuration of a pixel.

As illustrated in FIG. 8, the pixel 20 includes a pixel switching transistor 24, a memory circuit 25, a switch circuit 110, a pixel electrode 21, a common electrode 22, and an electrophoretic device 23.

The pixel switching transistor 24 is, for example, an n-type transistor. In the pixel switching transistor 24, a gate, a source, and a drain are electrically connected to a scanning line 40, a data line 50, and an input terminal N1 of the memory circuit 25, respectively. The pixel switching transistor 24 outputs an image signal supplied from the data line driving circuit 70 (see FIG. 7) through the data line 50 to the input terminal N1 of the memory circuit 25 at a time corresponding to a scanning signal supplied from the scanning line driving circuit 60 (see FIG. 7) on a pulse basis through the scanning line 40.

The memory circuit 25 includes inverter circuits 25a and 25b and is configured as a SRAM (Static Random Access Memory).

The inverter circuits 25a and 25b form a loop structure in which an input terminal of one circuit is electrically connected to an output terminal of another circuit. In other words, the input terminal of the inverter circuit 25a is electrically connected to the output terminal of the inverter circuit 25b, and the input terminal of the inverter circuit 25b is electrically connected to the output terminal of the inverter circuit 25a. The input terminal of the inverter circuit 25a is configured as the input terminal N1 of the memory circuit 25, and the output terminal of the inverter circuit 25a is configured as the output terminal N2 of the memory circuit 25.

The inverter circuit 25a includes an n-type transistor 25a1 and a p-type transistor 25a2. The gates of the n-type transistor 25a1 and the p-type transistor 25a2 are electrically connected to the input terminal N1 of the memory circuit 25. The source of the n-type transistor 25a1 is electrically connected to the low power potential line 92 supplied with the low power supply potential Vss. The source of the p-type transistor 25a2 is electrically connected to the high power potential line 91 supplied with the high power supply potential Vdd. The drains of the n-type transistor 25a1 and the p-type transistor 25a2 are electrically connected to the output terminal N2 of the memory circuit 25.

The inverter circuit 25b includes an n-type transistor 25b1 and a p-type transistor 25b2. The gates of the n-type transistor 25b1 and the p-type transistor 25b2 are electrically connected to the output terminal N2 of the memory circuit 25. The source of the n-type transistor 25b1 is electrically connected to the low power potential line 92 supplied with the low power supply potential Vss. The source of the p-type transistor 25b2 is electrically connected to the high power potential line 91 supplied with the high power supply potential Vdd. The drains of the n-type transistor 25b1 and the p-type transistor 25b2 are electrically connected to the input terminal N1 of the memory circuit 25.

In the memory circuit 25, in the case where a high level image signal is input into the input terminal N1 thereof, the low power supply potential Vss is output from the output terminal N2 thereof, and in the case where a low level image signal is input into the input terminal N1 thereof, the high power supply potential Vdd is output from the output terminal N2 thereof. Accordingly, the memory circuit 25 outputs either the low power supply potential Vss or the high power supply potential Vdd in accordance with whether the input image signal is high level or low level. In other words, the memory circuit 25 is configured such that the input image signal can be stored in accordance with the low power supply potential Vss or high the power supply potential Vdd.

The switch circuit 110 includes a first transmission gate 111 and a second transmission gate 112.

The first transmission gate 111 includes a p-type transistor 111p and an n-type transistor 111n. The sources of the p-type transistor 111p and the n-type transistor 111n are electrically connected to the first control line 94. The drains of the p-type transistor 111p and the n-type transistor 111n are electrically connected to the pixel electrode 21. The gate of the p-type transistor 111p is electrically connected to the input terminal N1 of the memory circuit 25. The gate of the n-type transistor 111n is electrically connected to the output terminal N2 of the memory circuit 25.

The second transmission gate 112 includes a p-type transistor 112p and an n-type transistor 112n. The sources of the p-type transistor 112p and the n-type transistor 112n are electrically connected to the second control line 95. The drains of the p-type transistor 112p and the n-type transistor 112n are electrically connected to the pixel electrode 21. The gate of the p-type transistor 112p is electrically connected to the output terminal N2 of the memory circuit 25. The gate of the n-type transistor 112n is electrically connected to the input terminal N1 of the memory circuit 25.

The switching circuit 110 alternatively selects one of the first control line 94 and the second control line 95 depending on an image signal input into the memory circuit 25, and then connects the selected control line electrically to the pixel electrode 21.

Specifically, in the case where a high level image signal is input into the input terminal N1 of the memory circuit 25, the low power supply potential Vss is output from the memory circuit 25 to the gates of the n-type transistor 111n and p-type transistor 112p, and the high power supply potential Vdd is output to the gates of the p-type transistor 111p and n-type transistor 112n, so that only the p-type transistor 112p and n-type transistor 112n included in the second transmission gate 112 become an on state, and the p-type transistor 111p and n-type transistor 111n included in the first transmission gate 111 become an off state.

On the other hand, in the case where a low level image signal is input into the input terminal N1 of the memory circuit 25, the high power supply potential Vdd is output from the memory circuit 25 to the gates of the n-type transistor 111n and p-type transistor 112p, and the low power supply potential Vss is output to the gates of the p-type transistor 111p and n-type transistor 112n, so that only the p-type transistor 111p and n-type transistor 111n included in the first transmission gate 111 become an on state, and the p-type transistor 112p and n-type transistor 112n included in the second transmission gate 112 become an off state. Accordingly, in the case where a high level image signal is input into the input terminal N1 of the memory circuit 25, only the second transmission gate 112 becomes an on state, and in the case where a low level image signal is input into the input terminal N1 of the memory circuit 25, only the first transmission gate 111 becomes an off state.

The pixel electrode 21 of each of the plural pixels 20 is electrically connected to the first control line 94 or the second control line 95 which is alternatively selected with the switch circuit 110 depending on an image signal. In this case, the pixel electrode 21 of each of the plural pixels 20 is supplied with a first potential S1 or a second potential S2 or is made to be in high impedance state in accordance with an on or off state of the switch 94s or 95s.

More specifically, in the pixel 20 which is supplied with a low level image signal, only the first transmission gate 111 becomes an on state. The pixel electrode 21 of this pixel 20 is electrically connected to the first control line 94. Then, the pixel electrode 21 is supplied with the first potential S1 from the power supply circuit 200 or is made to be in high impedance state in accordance with whether the switch 94s is in an on or off state. On the other hand, in the pixel 20 which is supplied with a high level image signal, only the second transmission gate 112 becomes an on state. The pixel electrode 21 of this pixel 20 is electrically connected to the second control line 95. Then, the pixel electrode 21 is supplied with the second potential S2 from the power supply circuit 200 or is made to be in high impedance state in accordance with whether the switch 95s is in an on or off state.

The pixel electrode 21 is disposed so as to face the common electrode 22 by interposing an electrophoretic device 23 therebetween. The common electrode 22 is electrically connected to the common power line 93 which is supplied with the common potential Vcom.

The electrophoretic device 23 includes a plurality of microcapsules each including electrophoretic particles.

In the above embodiments, although the pixel 20 having the memory circuit 25 configured as an SRAM and the switch circuit 110 including the transmission gates 111 and 112 has been described, it should be understood that the invention is not limited to these embodiments. For example, in the pixel 20, the output terminal N2 of the memory circuit 25 configured as an SRAM may be directly connected to the pixel electrode 21. Furthermore, the pixel 20 may includes a dynamic random access memory (DRAM) including a capacitor instead of the memory circuit 25 configured as an SRAM. The capacitor may be connected to the pixel electrode 21, and then the electrophoretic device 23 may be operated by charges stored in the capacitor depending on an image signal.

Electronic Device

An electronic device to which an electrophoretic display device as an example of the above described electro-optic device is applied will be described with reference to FIGS. 9 to 10. There will be described examples in which the above described electrophoretic display devices are applied to an electronic paper and an electronic notebook.

Figure 9:
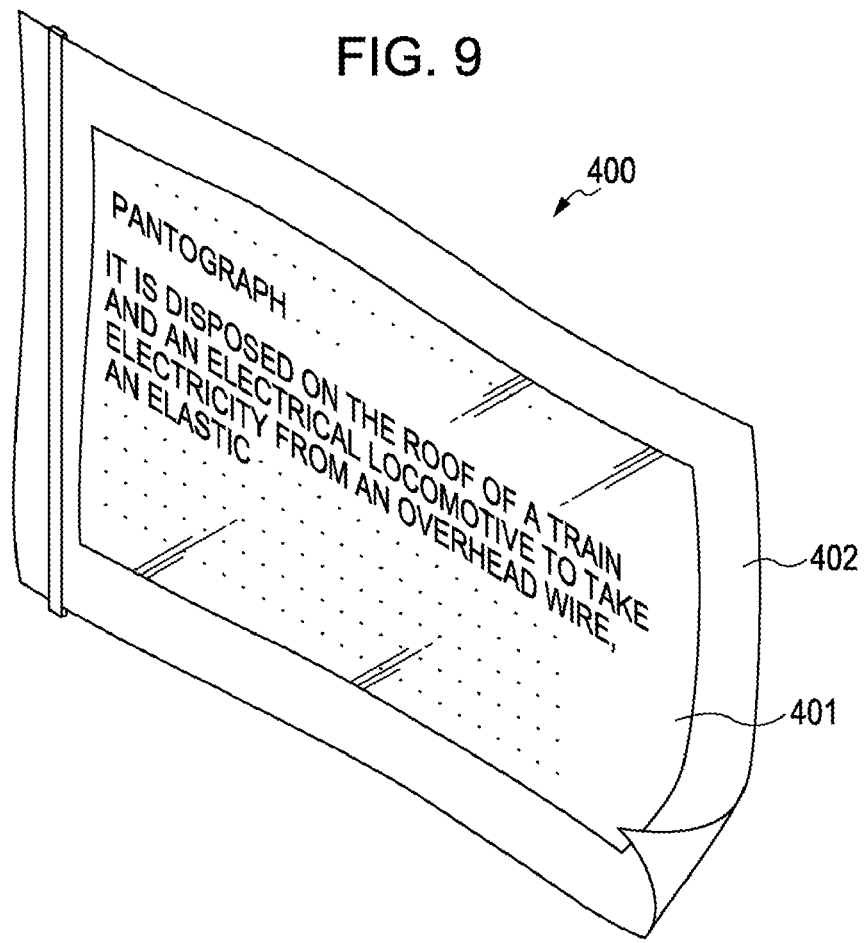
FIG. 9 is a perspective view illustrating the configuration of an electronic paper as an example of an electronic device to which an electrophoretic display device is applied.

FIG. 9 is a perspective view illustrating a sheet of electronic paper 400.

As illustrated in FIG. 9, the electronic paper 400 includes an electrophoretic display device according to the above described embodiments as a display 401. The electronic paper 400 has flexibility and includes a body 402 made of a rewritable sheet having the same texture and flexibility as conventional paper.

Figure 10:
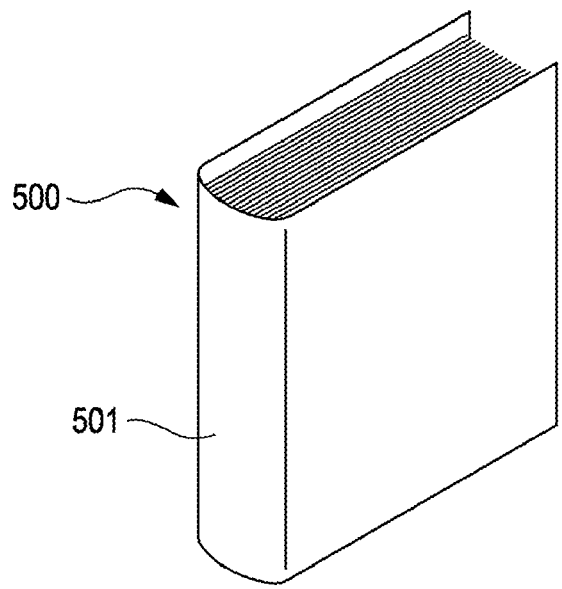
FIG. 10 is a perspective view illustrating the configuration of an electronic notebook as another example of an electronic device to which an electrophoretic display device is applied.

FIG. 10 is a perspective view illustrating an electronic notebook 500.

As illustrated in FIG. 10, sheets of electronic paper 400 illustrated in FIG. 9 are bundled in the electronic notebook 500 and covered with a cover 501. The cover 501 includes, for example, a display data inputting unit (not shown) for inputting display data transmitted from an external device. Thus, it is possible that a displayed content is changed and updated depending on display data while leaving the sheets of electronic paper being bundled.

Because the above described electronic paper 400 and electronic notebook 500 includes an electrophoretic display device according to the above described embodiments, it is possible that a high-quality image is displayed and electric power consumption is reduced.

It is possible that an electrophoretic display device according to the above described embodiments is applied to a display of an electronic device such as a watch, a cellular phone, and a portable audio other than the above examples.

It should be understood that the invention is not limited to the above embodiments and the invention is allowed to be changed within a scope not departing from the gist and spirit of the invention written in the specification and claims. The invention also includes a DC-DC converter circuit, an electro-optic device, and electronic device with modifications thereof.

The entire disclosure of Japanese Patent Application No. 2009-053297, filed Mar. 6, 2009 is expressly incorporated by reference herein.

What is claimed is:

1. A DC-DC converter circuit comprising:
   a boosting circuit including at least part of a DC-DC converter;
   a control signal circuit that controls the boosting circuit; and
   a power supply unit that includes a capacitor and is electrically connected to both of the boosting circuit and the control signal circuit and supplying at least the control signal circuit with an electric power,
   wherein the DC-DC converter includes a plurality of capacitors and switching units enabling each of the plurality of capacitors to be electrically independent,
   wherein the control signal circuit transmits a signal to the switching units when the DC-DC converter is not operating in an intermittent operation thereof, the signal indicating that each of the plurality of capacitors is made to be electrically independent, and
   wherein the power supply unit supplies the control signal circuit with the electric power using an electric charge stored in the capacitor when the DC-DC converter is not operating.

2. The DC-DC converter circuit according to claim 1, wherein the capacitor for supplying the electric power forms a part of the DC-DC converter.

3. An electro-optic device comprising the DC-DC converter circuit of claims 1 or 2.

4. An electronic device comprising the electro-optic device according to claim 3.

* * * * *